(12) United States Patent
Sharma

(10) Patent No.: US 9,935,774 B2
(45) Date of Patent: Apr. 3, 2018

(54) CONFIGURABLE CRYPTOGRAPHIC CONTROLLER AREA NETWORK (CAN) DEVICE

(71) Applicant: NXP B.V., Eindhoven (NL)

(72) Inventor: Vibhu Sharma, Eindhoven (NL)

(73) Assignee: NXP B.V., Eindhoven (NL)

( * ) Notice: Subject to any disclaimer, the term of this patent is extended or adjusted under 35 U.S.C. 154(b) by 98 days.

(21) Appl. No.: 14/954,638

(22) Filed: Nov. 30, 2015

(65) Prior Publication Data

US 2016/0344552 A1 Nov. 24, 2016

Related U.S. Application Data

(63) Continuation-in-part of application No. 14/812,909, filed on Jul. 29, 2015, now Pat. No. 9,825,918, and a
(Continued)

(51) Int. Cl.
*H04L 9/32* (2006.01)
*H04L 29/06* (2006.01)
(Continued)

(52) U.S. Cl.
CPC .......... *H04L 9/3242* (2013.01); *G06F 21/602* (2013.01); *G06F 21/606* (2013.01);
(Continued)

(58) Field of Classification Search
CPC ............... H04L 9/3242; H04L 63/1408; H04L 12/40032; H04L 63/06; H04L 2012/40273; H04L 2012/40215; G06F 21/567
See application file for complete search history.

(56) References Cited

U.S. PATENT DOCUMENTS 6,314,351 B1 11/2001 Chutorash
6,654,351 B1 11/2003 Casey
(Continued)

FOREIGN PATENT DOCUMENTS

CN 101026527 A 8/2007
EP 2797263 A1 10/2014
(Continued)

OTHER PUBLICATIONS

Japanese Information Technology Promotion Agency; "Approaches for Vehicle Information Security"; 55 pgs; Aug. 2013.
(Continued)

*Primary Examiner* — Joseph P Hirl
*Assistant Examiner* — J. Brant Murphy
(74) *Attorney, Agent, or Firm* — Rajeev Madnawat

(57) ABSTRACT

Embodiments of a device and method are disclosed. In an embodiment, a CAN device includes a security module connected between a CAN bus interface of a CAN transceiver and a microcontroller communications interface of the CAN transceiver and an operational mode controller connected between the security module and the CAN bus interface. The security module is configured to perform a security function on data traffic received from the CAN bus interface or from the microcontroller communications interface. The operational mode controller is configured to set an operational mode for the CAN transceiver such that a CAN Flexible Data-rate (FD) frame or a corresponding CAN frame is output from the CAN bus interface. An identifier of the CAN FD frame is the same as an identifier of the corresponding CAN frame.

19 Claims, 14 Drawing Sheets

Related U.S. Application Data continuation-in-part of application No. 14/720,132, filed on May 22, 2015.

(51) Int. Cl.
*H04L 12/40* (2006.01)
*G06F 21/60* (2013.01)
*G06F 21/85* (2013.01)

(52) U.S. Cl.
CPC ........ *G06F 21/85* (2013.01); *H04L 12/40032* (2013.01); *H04L 63/06* (2013.01); *H04L 63/123* (2013.01); *H04L 63/1408* (2013.01); *H04L 2012/40215* (2013.01); *H04L 2012/40273* (2013.01)

(56) References Cited

U.S. PATENT DOCUMENTS

| | | |
|---|---|---|
| 7,885,405 B1 | 2/2011 | Bong |
| 8,925,083 B2 | 12/2014 | Niner et al. |
| 2003/0223586 A1 | 12/2003 | Green |
| 2005/0113068 A1 | 5/2005 | Hoffmann |
| 2005/0138386 A1 | 6/2005 | Le Saint |
| 2011/0093639 A1* | 4/2011 | Richards ........... H04L 12/40032 710/310 |
| 2012/0271975 A1* | 10/2012 | Elend ........ H04L 12/12 710/105 |
| 2012/0297105 A1* | 11/2012 | Elend ........ H04L 12/40032 710/305 |
| 2013/0227648 A1 | 8/2013 | Ricci |
| 2013/0294460 A1* | 11/2013 | Hell ........ H03F 3/24 370/470 |
| 2014/0129748 A1* | 5/2014 | Muth ........ G06F 13/4072 710/106 |
| 2014/0250531 A1 | 9/2014 | Moeller et al. |
| 2014/0328352 A1 | 11/2014 | Mabuchi et al. |
| 2014/0330996 A1* | 11/2014 | de Haas ........ G06F 13/4031 710/106 |
| 2014/0337976 A1 | 11/2014 | Moeller et al. |
| 2014/0365693 A1* | 12/2014 | Monroe ........ G06F 13/385 710/105 |
| 2015/0085411 A1 | 3/2015 | Yang et al. |
| 2015/0089236 A1* | 3/2015 | Han ........ H04L 9/3242 713/181 |
| 2015/0180840 A1* | 6/2015 | Jung ........ H04L 9/0825 713/150 |
| 2015/0229654 A1* | 8/2015 | Perier ........ H04W 12/06 726/3 |
| 2015/0358351 A1 | 12/2015 | Otsuka et al. |

FOREIGN PATENT DOCUMENTS

| | | |
|---|---|---|
| WO | 00/09363 A1 | 2/2000 |
| WO | 2014/115455 A1 | 7/2014 |

OTHER PUBLICATIONS

Koscher et al.; "Experimental security analysis of a modern automobile"; in Proc. IEEE Security Privacy. Symp.; Oakland, CA; pp. 447-462; 2010.

Checkoway, D. et al.; "Comprehensive Experimental Analysis of Automotive Attack Surfaces"; in Proceedings of the USENIX Security Symposium, San Francisco, CA; 16 pgs.; Aug. 2011.

Bosch; "CAN Specification"; version 2.0; 73 pgs.; 1991.

Bosch; "CAN with Flexible Data-Rate"; White paper, version 1.1; 16 pgs.; 2011.

Van Herrewege, A. et al.; "CANAuth—A Simple, Backward Compatible Broadcast Authentication Protocol for Can bus"; In ECRYPT Workshop on Lightwent Cryptography; 7 pgs; 2011.

Non-Final Rejection dated Mar. 9, 2017 for U.S. Appl. No. 14/812,909 17 pages.

Final Rejection dated May 5, 2017 for U.S. Appl. No. 14/812,909 21 pages.

Non-Final Rejection dated May 11, 2017 for U.S. Appl. No. 14/720,132 23 pages.

Philips Semiconductors,"Product Specification PCA 82C200, Stand-alone CAN-conroller", 36 pgs. (Nov. 1992).

Bosch; "SMI700 for vehichle dynamics control", 1 pg. (2015).

\* cited by examiner

CONFIGURABLE CRYPTOGRAPHIC CONTROLLER AREA NETWORK (CAN) DEVICE

REFERENCE TO RELATED APPLICATIONS

This application is a Continuation-in-part of U.S. Utility application Ser. No. 14/720,132, filed May 22, 2015, entitled "In-Vehicle Network (IVN) Device and Method for Operating an IVN Device," which is incorporated by reference herein. This application is also a Continuation-in-part of U.S. Utility application Ser. No. 14/812,909, filed Jul. 29, 2015, entitled "Controller Area Network (CAN) Device and Method for Operating a CAN Device," which is incorporated by reference herein.

BACKGROUND

An in-vehicle network (IVN) is used to facilitate communications between devices, such as electronic control units (ECU), within a vehicle. Vehicles can be interconnected, for example, connected to the Internet, e.g., to provide network access to passengers within the vehicles. However, connected vehicles can pose a serious threat to the integrity of the vehicles. For example, ECUs within an IVN of a vehicle that is connected to the Internet can be exposed to vulnerabilities caused by, for example, malware.

SUMMARY

Embodiments of a CAN device, a CAN transceiver and a method for operating a CAN device are disclosed. In an embodiment, a CAN device includes a security module connected between a CAN bus interface of a CAN transceiver and a microcontroller communications interface of the CAN transceiver and an operational mode controller connected between the security module and the CAN bus interface. The security module is configured to perform a security function on data traffic received from the CAN bus interface or from the microcontroller communications interface. The operational mode controller is configured to set an operational mode for the CAN transceiver such that a CAN Flexible Data-rate (FD) frame or a corresponding CAN frame is output from the CAN bus interface. An identifier of the CAN FD frame is the same as an identifier of the corresponding CAN frame.

In an embodiment, the security module is a programmable cryptographic module configured to execute security software programs to process a data payload that is carried by a plurality of data signals received through the microcontroller communications interface or through the CAN bus interface.

In an embodiment, the programmable cryptographic module is configured to generate a Cipher-based Message Authentication Code (CMAC) digest and a counter value based on the data payload.

In an embodiment, the CAN device further includes a CAN FD protocol controller connected to the microcontroller communications interface and to the operational mode controller. The CAN FD protocol controller is configured to combine the payload with the CMAC digest and the counter value to generate the CAN FD frame.

In an embodiment, the CAN FD protocol controller is further configured to generate the CAN frame.

In an embodiment, the programmable cryptographic module includes a security core configured to execute security software routines and a memory device configured to store security configuration information for the security software routines.

In an embodiment, the CAN device further includes a CAN protocol decoder configured to extract the data payload from the data signals received through the microcontroller communications interface. The security core is further configured to process the data payload to generate a CMAC digest and a counter value.

In an embodiment, the CAN device further includes a CAN FD protocol controller connected to the microcontroller communications interface and to the operational mode controller. The CAN FD protocol controller is configured to combine the payload with the CMAC digest and the counter value to generate the CAN FD frame.

In an embodiment, the CAN FD protocol controller is further configured to generate the CAN frame that has the same packet identification number as the CAN FD frame.

In an embodiment, the operational mode controller includes an AND gate and first and second multiplexers. Selection signals to the first and second multiplexers include an output signal of the AND gate and a control signal from a control terminal of the operational mode controller.

In an embodiment, input signals to the AND gate include the control signal and an acknowledgement signal. Input signals to the first multiplexer include the CAN FD frame and the CAN frame. Input signals to the second multiplexer include the CAN FD frame and an output signal from the first multiplexer.

In an embodiment, the CAN microcontroller communications interface includes a receive data (RXD) interface, a transmit data (TXD) interface and a Serial Peripheral Interface (SPI)/Inter-Integrated Circuit (I2C)/Direct Memory Access (DMA) interface.

In an embodiment, a CAN transceiver includes the CAN device, the CAN bus interface, the microcontroller communications interface, a transmitter, and a receiver.

In an embodiment, an electronic control unit includes the CAN transceiver and a microcontroller. The microcontroller communications interface of the CAN transceiver is used for communications with the microcontroller.

In an embodiment, a CAN transceiver includes a CAN bus interface having a CAN high (CANH) bus interface and a CAN low (CANL) bus interface, a CAN microcontroller communications interface having a RXD interface, a TXD interface and an SPI/I2C/DMA interface, a programmable cryptographic module connected between the CAN bus interface and the CAN microcontroller communications interface, and an operational mode controller connected between the programmable cryptographic module and the CAN bus interface. The programmable cryptographic module is configured to perform a security function on data traffic received from the CAN bus interface or from the CAN microcontroller communications interface. The operational mode controller is configured to set an operational mode for the CAN transceiver such that a CAN FD frame or a corresponding CAN frame is output from the CAN bus interface. An identifier of the CAN FD frame is the same as an identifier of the corresponding CAN frame.

In an embodiment, the programmable cryptographic module includes a security core having at least one of a hardware-based Advanced Encryption Standard (AES) engine, a hardware-based Secure Hash Algorithm (SHA) engine, a hardware-based counter and a hardware-based true random number generator, and a memory device configured to store security configuration information for the security core.

In an embodiment, the CAN transceiver further includes a CAN protocol decoder configured to extract the data payload from the data signals received through the CAN microcontroller communications interface. The security core is further configured to process the data payload to generate a CMAC digest and a counter value.

In an embodiment, the CAN transceiver further includes a CAN FD protocol controller connected to the CAN microcontroller communications interface and to the operational mode controller. The CAN FD protocol controller is configured to combine the payload with the CMAC digest and the counter value to generate the CAN FD frame and generate the CAN frame that has the same packet identification number as the CAN FD frame.

In an embodiment, the operational mode controller includes an AND gate and first and second multiplexers. Selection signals to the first and second multiplexers include an output signal of the AND gate and a control signal from a control terminal of the operational mode controller. Input signals to the AND gate include the control signal and an acknowledgement signal. Input signals to the first multiplexer include the CAN FD frame and the CAN frame. Input signals to the second multiplexer include the CAN FD frame and an output signal from the first multiplexer.

In an embodiment, a method for operating a CAN device involves performing a security function on data traffic received from a CAN bus interface of a CAN transceiver or from a microcontroller communications interface of the CAN transceiver using a security module of the CAN device connected between the CAN bus interface and the microcontroller communications interface and setting an operational mode for the CAN transceiver using an operational mode controller connected between the security module and the CAN bus interface such that a CAN Flexible FD frame or a corresponding CAN frame is output from the CAN bus interface. An identifier of the CAN FD frame is the same as an identifier of the corresponding CAN frame.

Other aspects in accordance with the invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

Figure 1:
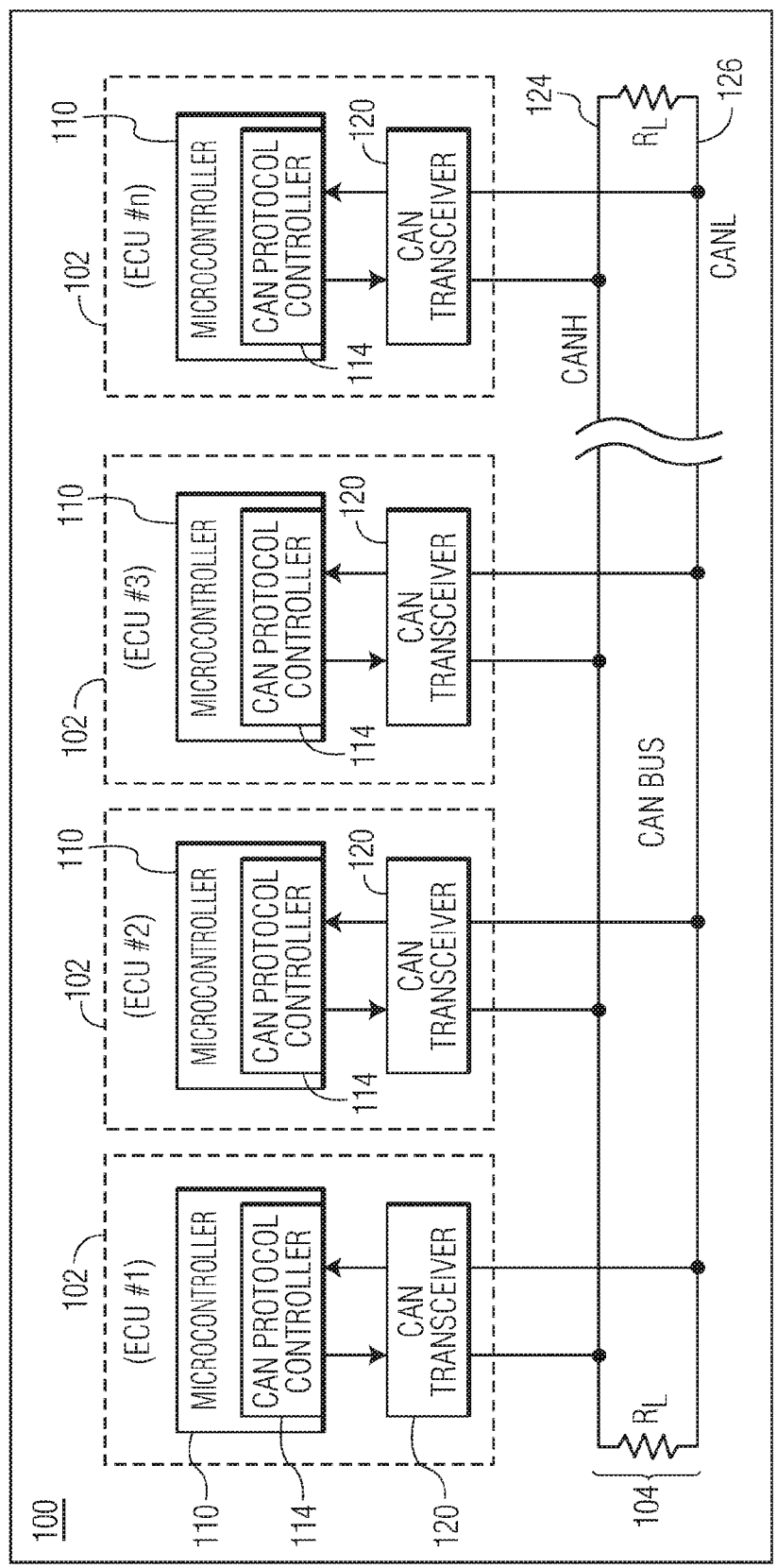
FIG. 1 depicts a CAN network that includes multiple electronic control units (ECUs), each connected to a CAN bus.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

Techniques described herein can be applied to any type of in-vehicle networks (IVNs), including a Controller Area Network (CAN), a Local Interconnect Network (LIN), a Media Oriented Systems Transport (MOST) network, a FlexRay™ compatible network, and other types of IVNs. Although in some embodiments a specific type of IVN is described, it should be noted that the invention is not restricted to a specific type of IVN.

FIG. 1 depicts a CAN network 100 that includes multiple CAN nodes 102, also referred to as "ECUs," each connected to a CAN bus 104. In the embodiment of FIG. 1, each CAN node includes a microcontroller 110 having an embedded CAN protocol controller 114 and a CAN transceiver 120. The microcontrollers are typically connected to at least one device (not shown) such as a sensor, an actuator, or some other control device and are programmed to determine the meaning of received messages and to generate appropriate outgoing messages. The microcontrollers, also referred to as host processors, hosts, or digital signal processors (DSPs), are known in the field. In an embodiment, the host supports application software that interacts with the CAN protocol controller.

In the embodiment of FIG. 1, each ECU 102 includes a microcontroller 110 having an embedded CAN protocol controller 114 and a CAN transceiver 120. The microcontrollers are typically connected to at least one device such as a sensor, an actuator, or some other control device and are programmed to determine the meaning of received messages and to generate appropriate outgoing messages. The microcontrollers, also referred to as host processors or digital signal processors (DSPs), are known in the field. In some embodiments, at least one microcontroller does not include a CAN protocol controller. In these embodiments, the microcontroller directly accesses its corresponding CAN transceiver.

The CAN protocol controllers 114, which can be embedded within the microcontrollers 110 or external to the microcontrollers, implement data link layer operations as is known in the field. For example, in receive operations, a CAN protocol controller stores received serial bits from the transceiver until an entire message is available for fetching by the microcontroller. The CAN protocol controller can also decode the CAN frames according to the standardized frame format. In transmit operations, the CAN protocol controller receives messages from the microcontroller and transmits the messages as serial bits in CAN frame format to the CAN transceiver.

The CAN transceivers 120 are located between the microcontrollers 110 and the CAN bus 104 and implement physical layer operations. For example, in receive operations, a CAN transceiver converts analog differential signals from the CAN bus to serial digital signals that the CAN protocol controller can interpret. The CAN transceiver also protects the CAN protocol controller from extreme electrical conditions on the CAN bus, e.g., electrical surges. In transmit operations, the CAN transceiver converts serial digital bits received from the CAN protocol controller into analog differential signals that are sent on the CAN bus.

The CAN bus 104 carries analog differential signals and includes a CAN high (CANH) bus line 124 and a CAN low (CANL) bus line 126. One or more resistors, RL, may exist between the CANH bus line and the CANL bus line. The CAN bus is known in the field.

Figure 2:
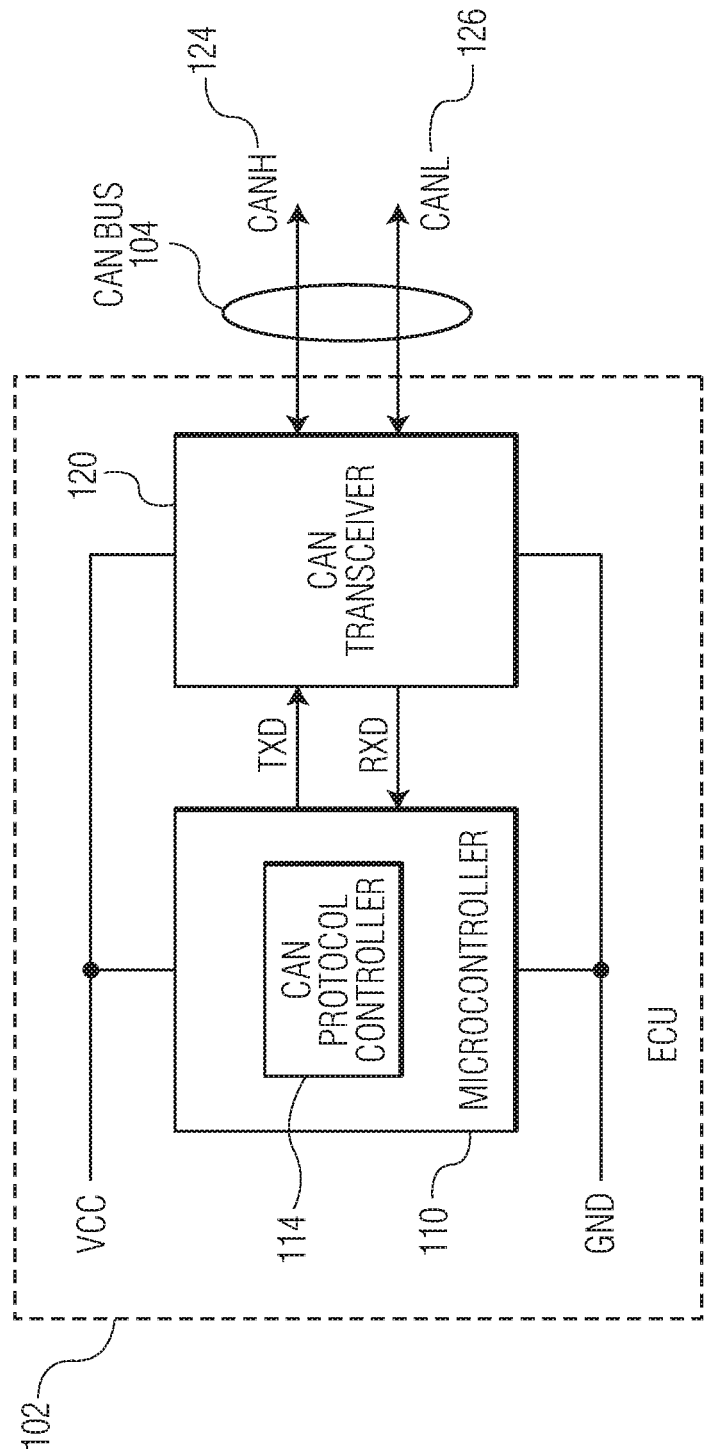
FIG. 2 depicts an expanded view of one ECU from FIG. 1.

FIG. 2 depicts an expanded view of one ECU 102 from FIG. 1. The microcontroller 110 and the CAN transceiver 120 of the ECU are connected between a supply voltage, $V_{CC}$, and ground, GND. As illustrated in FIG. 2, data communicated from the microcontroller to the CAN transceiver is identified as transmit data (TXD) and data communicated from the CAN transceiver to the microcontroller is referred to as receive data (RXD). Transmit data (TXD) is communicated on a TXD path and receive data (RXD) is communicated on an RXD path. Data is communicated to and from the CAN bus via the CANH and CANL bus lines 124 and 126, respectively.

As noted above, the CAN protocol controller 114 can be configured to support the normal mode or the flexible data rate mode. As used herein, "CAN normal mode" (also referred to as "Classical CAN mode") refers to frames that are formatted according to the ISO 11898-1 standard and "CAN FD mode" refers to frames that are formatted according to the emerging ISO/Draft International Standard (DIS) 11898-1 standard, or an equivalent thereof.

Figure 3A:
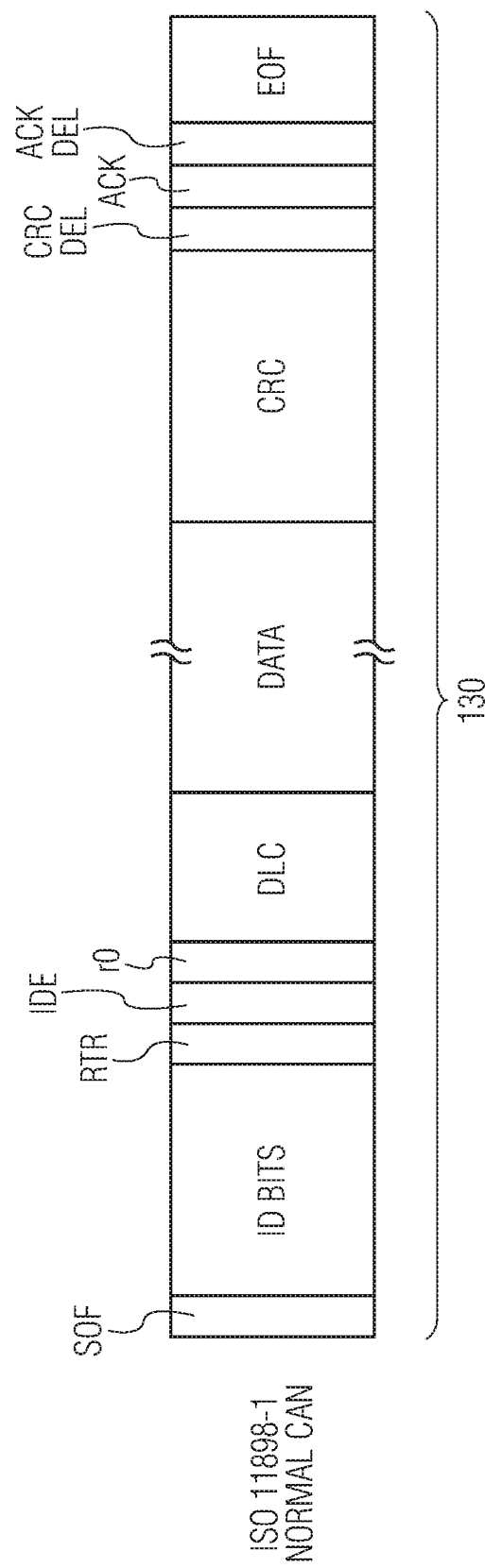
FIG. 3A depicts the format of an ISO 11898-1 frame that is used in CAN normal mode.
Figure 3B:
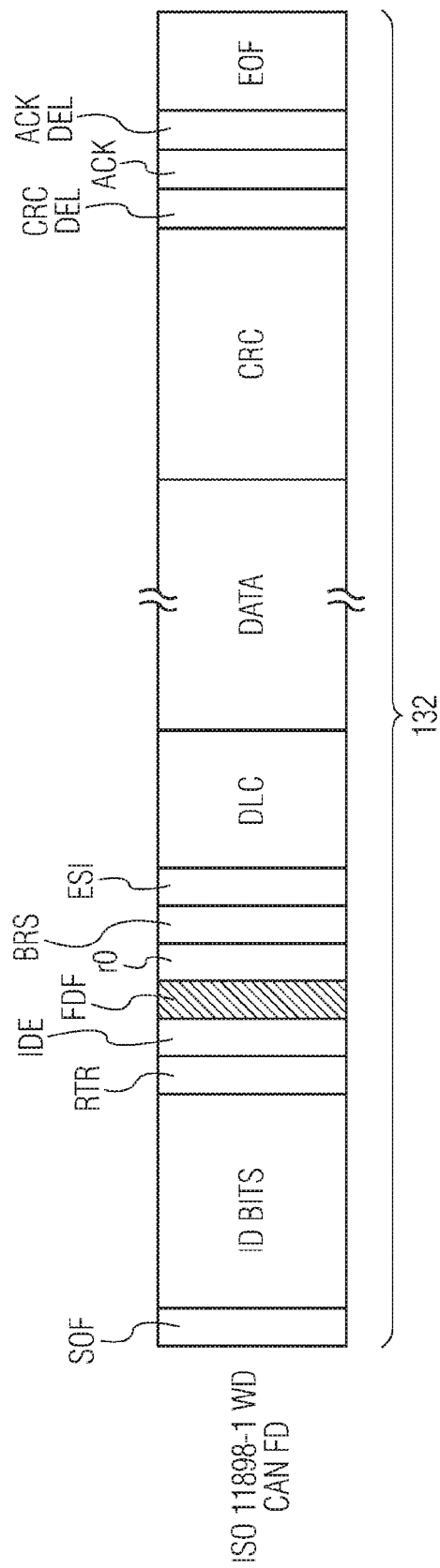
FIG. 3B depicts the format of an ISO 11898-1 WD frame that is used in CAN FD mode.

FIG. 3A depicts the format of an ISO 11898-1 frame 130 (in the classical base frame format (CBFF) or standard format) that is used in CAN normal mode and FIG. 3B depicts the format of an ISO/DIS 11898-1 frame 132 (in the FD base frame format or FBFF) that is used in CAN FD mode. The fields of the CAN normal mode and CAN FD mode frames are defined as follows:

SOF Start of Frame (always dominant)
IDENTIFIER Identifier Bits, defining the message content
RTR Remote transmission Request
IDE ID Extension
r0 Reserved Bit 0 (replaced by FDF in the CAN FD format)
FDF FD Format (this is the bit distinguishing the frame formats)
BRS Baud Rate Switch
ESI Error State Indicator
DLC Data Length Code
Data Data Bytes
CRC Cyclic Redundancy Check
CRC Del CRC Delimiter (always recessive)
ACK Acknowledge
ACK Del Acknowledge Delimiter
EOF End Of Frame There is also another version of the classical frame format, referred to as "classical extended frame format (CEFF)," in which the FDF bit is in the old r1 position, whereas the FDF bit is in the r0 position in CBFF. There is also a "FD extended frame format (FEFF)," where "extended" refers to a 29-bit identifier. Of note, the CAN protocols use the reserved bit (r0 or r1) (also referred to generally as the FDF bit) within a CAN frame to identify a frame as a CAN FD mode frame. In particular, the FDF bit is a 1-bit field that indicates whether the frame is a CAN normal mode frame (ISO 11898-1) or a CAN FD mode frame (ISO/DIS 11898-1). When the FDF bit is dominant (e.g., low or "0"), the frame is a CAN normal mode frame and when the FDF bit is recessive (e.g., high or "1"), the frame is a CAN FD mode frame. In a CAN normal mode frame, the reserved bits (r0, r1) are always driven dominant to the bus lines.

Enabling cryptographic operations in a CAN network is a challenging task considering the data field payload limitation (e.g. a data payload has 8 Bytes while a minimum Cipher-based Message Authentication Code (CMAC) signature has 16 Bytes), real time response requirements due to the critical nature of the CAN network, the limited bandwidth of the CAN network, and the compatibility with legacy devices that may be present on the CAN network. Consequently, implementing IVN cybersecurity can be a complex tradeoff between the limitations of the cryptographic primitives and the limitations imposed by IVNs.

In accordance with an embodiment of the invention, a CAN device includes a security module connected between a CAN bus interface of a CAN transceiver and a microcontroller communications interface of the CAN transceiver and an operational mode controller connected between the security module and the CAN bus interface. The security module is configured to perform a security function on data traffic received from the CAN bus interface or from the microcontroller communications interface. The operational mode controller is configured to set an operational mode for the CAN transceiver such that a CAN Flexible Data-rate (FD) frame or a corresponding CAN frame is output from the CAN bus interface. The identifier of the CAN FD frame is the same as the identifier of the corresponding CAN frame. The identifier of the CAN FD frame or the CAN frame can be used carry identification information of the CAN FD frame or the CAN frame. For example, the identifier of the CAN FD frame or the CAN frame can include information that identifies the originating microcontroller 410.

Figure 4:
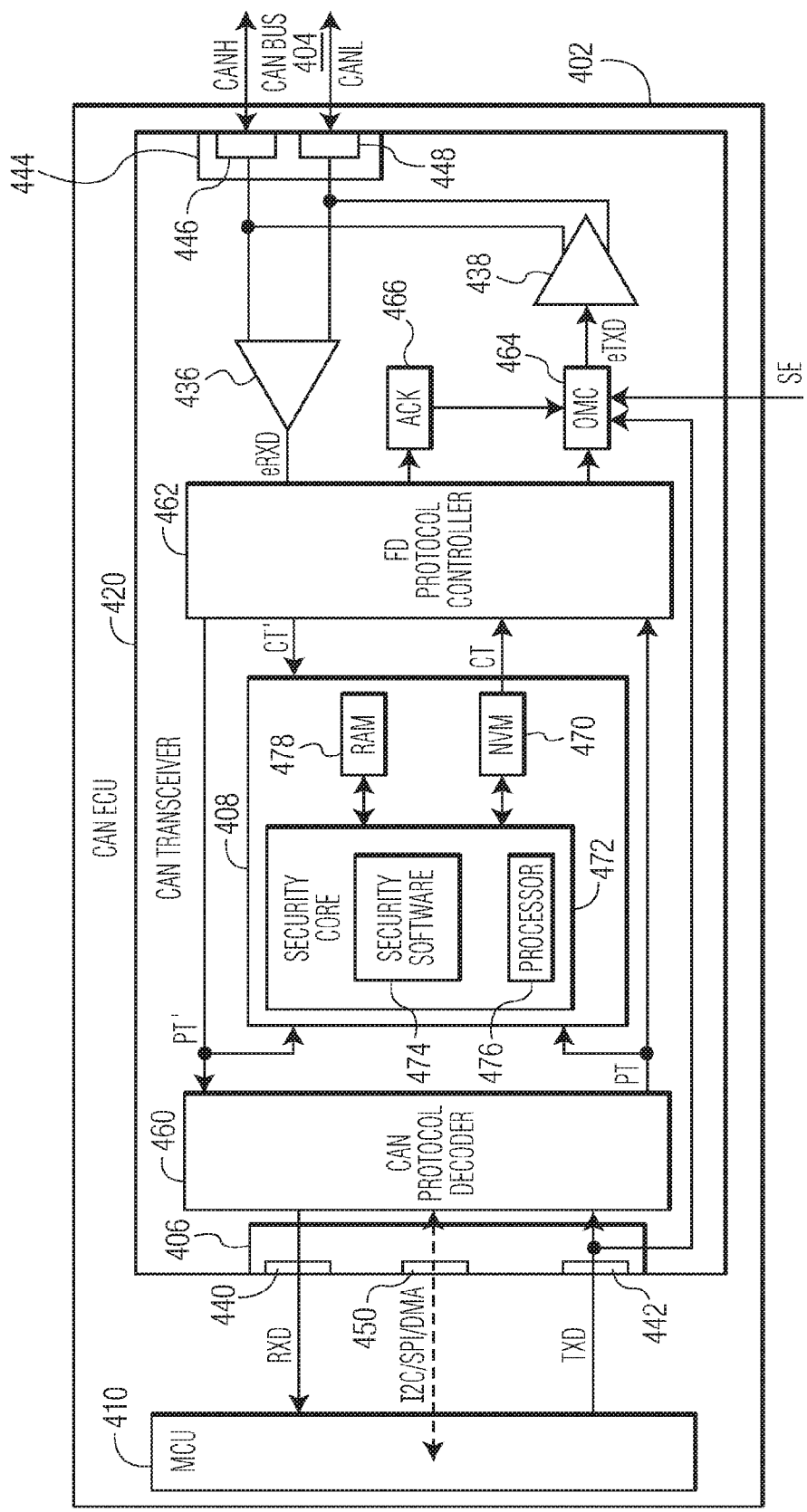
FIG. 4 depicts an embodiment of a CAN ECU that includes a microcontroller and a CAN transceiver.

FIG. 4 depicts an embodiment of a CAN ECU 402 that includes a microcontroller (MCU) 410 and a CAN transceiver 420 that includes a security module 408 and an operational mode controller (OMC) 464. Although the ECU is described in the embodiment depicted in FIG. 4 as being a CAN ECU, in other embodiments, the ECU is another type of IVN ECU that includes a corresponding IVN transceiver, such as a LIN transceiver, a MOST network transceiver, a FlexRay™ compatible transceiver, or another type of IVN transceiver. In the CAN ECU 402 depicted in FIG. 4, the CAN transceiver 420 includes the security module 408, a CAN protocol decoder 460, a flexible data rate (FD) protocol controller 462, the OMC 464, an acknowledgement (ACK) module 466, a receiver 436, a transmitter 438, a microcontroller communications interface 406, and a CAN bus interface 444 having a CANH bus interface 446 and a CANL bus interface 448. In the embodiment depicted in FIG. 4, the microcontroller communications interface includes a receive data (RXD) interface 440, a transmit data (TXD) interface 442, and/or a Serial Peripheral Interface (SPI)/Inter-Integrated Circuit (I2C)/Direct Memory Access (DMA) interface 450. In an embodiment, the OMC and the ACK module are included in the same IC package. However, in other embodiments, the OMC and the ACK module are included in separate IC packages. In an embodiment, the security module and the FD protocol controller are included in the same IC package. In other embodiments, the security module and the FD protocol controller are implemented in separate IC packages.

Retrofitting or replacing classical CAN nodes with CAN nodes that can handle larger payloads (CAN FD traffic) can be costly and time-consuming. Consequently, it is desirable to also have classical CAN nodes coexisting on the same network with nodes that can handle CAN FD traffic while providing security for critical nodes in the network and allowing non-critical (which do not require security) nodes to also participate in the communication without changing the existing network architecture. In some embodiments, for each CAN frame, the CAN transceiver 420 creates an additional CAN FD frame with a non-truncated CMAC signature (128 bit, 192 bit and 256 bit) and counter bits and the data of the original CAN frame. The newly created CAN FD frame is used for the communications with the security enabled communications nodes connected to the CAN bus 404. The identifier (ID) of this CAN FD frame is the same as the identifier (ID) of the original CAN frame. The interface between the CAN transceiver and the microcontroller can be the RXD interface 440, the TXD interface 442, and/or the I2C/SPI/DMA interface 450. In these embodiments, network traffic is increased because the additional CAN FD frame is transmitted. However, security critical messages are typically a small percentage of the total number of messages. Consequently, the impact on the network traffic is moderate. In addition, non-secure classical CAN nodes in the network can filter out the CAN FD frames with the help of an FD shield, as described in U.S. Utility application Ser. No. 14/812,909.

The microcontroller communications interface 406 is used for communications between the microcontroller 410 and the CAN transceiver 420. In the embodiment depicted in FIG. 4, the microcontroller communications interface includes the RXD interface 440, the TXD interface 442, and/or the I2C/SPI/DMA interface 450. In some embodiments, the RXD interface and the TXD interface are used to communicate with a protocol controller of the microcontroller. The SPI/I2C/DMA interface is used to communicate with a SPI/I2C/DMA interface of the microcontroller. In embodiments in which the microcontroller does not include a protocol controller, the microcontroller directly communicates with the security module 408 of the CAN transceiver through the I2C/SPI/DMA interface 450, consequently, the CAN protocol decoder 460 is bypassed.

The CAN bus interface 444 is used for communications between the CAN transceiver 420 and a CAN bus 404. In an exemplary operation of the CAN ECU 402, CAN traffic that is received at the CAN bus interface is processed by the CAN protocol decoder 460 and/or the security module 408 and passed to the microcontroller 410 through the RXD interface 440 and CAN traffic that is received at the TXD interface 442 is processed by the CAN protocol decoder and/or the security module and transmitted out the CAN bus interface via the transmitter 438.

The CAN protocol decoder 460 is configured to extract the data payload from a CAN frame received from the microcontroller communications interface 406. The CAN protocol decoder can be implemented in software stored on a computer readable medium (e.g., memory) and/or hardware.

The security module 408 is configured to perform one or more security functions for the data traffic received from the microcontroller communications interface 406 or from the CAN bus interface 444. In the embodiment depicted in FIG. 4, the security module is a programmable cryptographic module that can execute software-based security programs and can be reprogrammed (e.g., reflashed) to execute various software-based security programs. However, in other embodiments, the security module is a non-programmable hardware based cryptographic module for executing a particular security program that cannot be reprogrammed (e.g., reflashed) to execute other security programs. The security module may be the same as or similar to the security module, the stream cipher module, the programmable cryptographic module, and/or the cryptographic module described in U.S. Utility application Ser. No. 14/720,132, and/or the security module described in U.S. Utility application Ser. No. 14/812,909.

In the embodiment depicted in FIG. 4, the security module 408 is implemented as a programmable cryptographic module, which includes a security core 472 configured to execute security software 474 and a volatile memory such as a random access memory (RAM) 478 and a non-volatile memory (NVM) 470 configured to store security configuration information for the security software routines. In some embodiments, the security module is configured to execute the security software 474 to process a data payload that is carried by data signals received through the microcontroller communications interface 406 or through the CAN bus interface 444. In an embodiment, the security module is configured to generate a Cipher-based Message Authentication Code (CMAC) digest and a counter value based on the data payload. In an embodiment, the security core includes a processor 476 and/or dedicated cryptographic hardware (HW) accelerators (e.g. encryption/decryption engines, counters and true random number generators). In an embodiment, the security core includes at least one of a hardware-based Advanced Encryption Standard (AES) engine, a hardware-based Secure Hash Algorithm (SHA) engine, a hardware-based counter and a hardware-based true random number generator. The processor can be used to perform cryptographic operations, such as AES and random number generation. In some embodiments, the processor is configured to perform message encryption using an encryption key or to perform message decryption using a decryption key. In an embodiment, the RAM and the NVM are configured to store security keys, propriety codes, and configuration settings.

The FD protocol controller 462 is configured to encode input data to generate a CAN FD frame or to decode/translate a CAN FD frame. The FD protocol controller can encode input data received from the security module 408 or input data directly from the microcontroller communications interface 406. The FD protocol controller can verify transmission related errors of incoming data frames (eRXD) from the receiver 436. In an embodiment, the security module 408 encrypts input data from the microcontroller 410 to generate a cipher data output and the FD protocol controller encodes the cipher data output and the input data to generate a CAN FD frame, which is transmitted through the CAN bus 404. In another embodiment, the FD protocol controller decodes CAN FD data traffic to generate decoded data and the security module decrypts the decoded data. The security module can verify the cryptographic integrity of the decoded data and generate and transmit a signal (e.g., an interrupt) if the cryptographic integrity of the decoded data has been successfully verified. In some embodiments, the FD protocol controller checks the cyclic redundancy check (CRC) code of a received CAN FD frame. If the FD protocol controller determines that the CAN FD frame does not contain transmission related errors, cipher text is recovered. Otherwise, the CAN FD frame is rejected and a rejection message is generated.

In some embodiments, the CAN protocol decoder 460 is configured to extract a data payload from data signals received from the microcontroller 410 through the microcontroller communications interface 406 or from data signals received from the CAN bus 404 through the CAN bus interface 444. The security core 472 is further configured to process the data payload to generate a Cipher-based Message Authentication Code (CMAC) digest and a counter value. The FD protocol controller 462 is configured to combine the payload with the CMAC digest and the counter value to generate a CAN FD frame. The CAN FD protocol controller can also be configured to generate a CAN frame that has the same identifier (ID) as the CAN FD frame.

The operational mode controller (OMC) 464 is connected between the security module 408 and the CAN bus interface 444. In some embodiments, the operational mode controller is configured to set an operational mode for the CAN transceiver 420 such that a CAN Flexible Data-rate (FD) frame or a corresponding CAN frame with an identifier that is the same as an identifier of the CAN FD frame is output from the CAN bus interface, in response to a control signal, "SE," from a control terminal of the operational mode controller. The operational mode controller can set the operational mode for the CAN transceiver based on an acknowledgement (ACK) signal generated by the ACK module 466. In an embodiment, the operational mode controller includes an AND gate and first and second multiplexers, and selection signals for the first and second multiplexers include an output signal of the AND gate and the control signal, SE. The operational mode controller outputs an encrypted transmit data (eTXD) to the transmitter 438.

Figure 5:
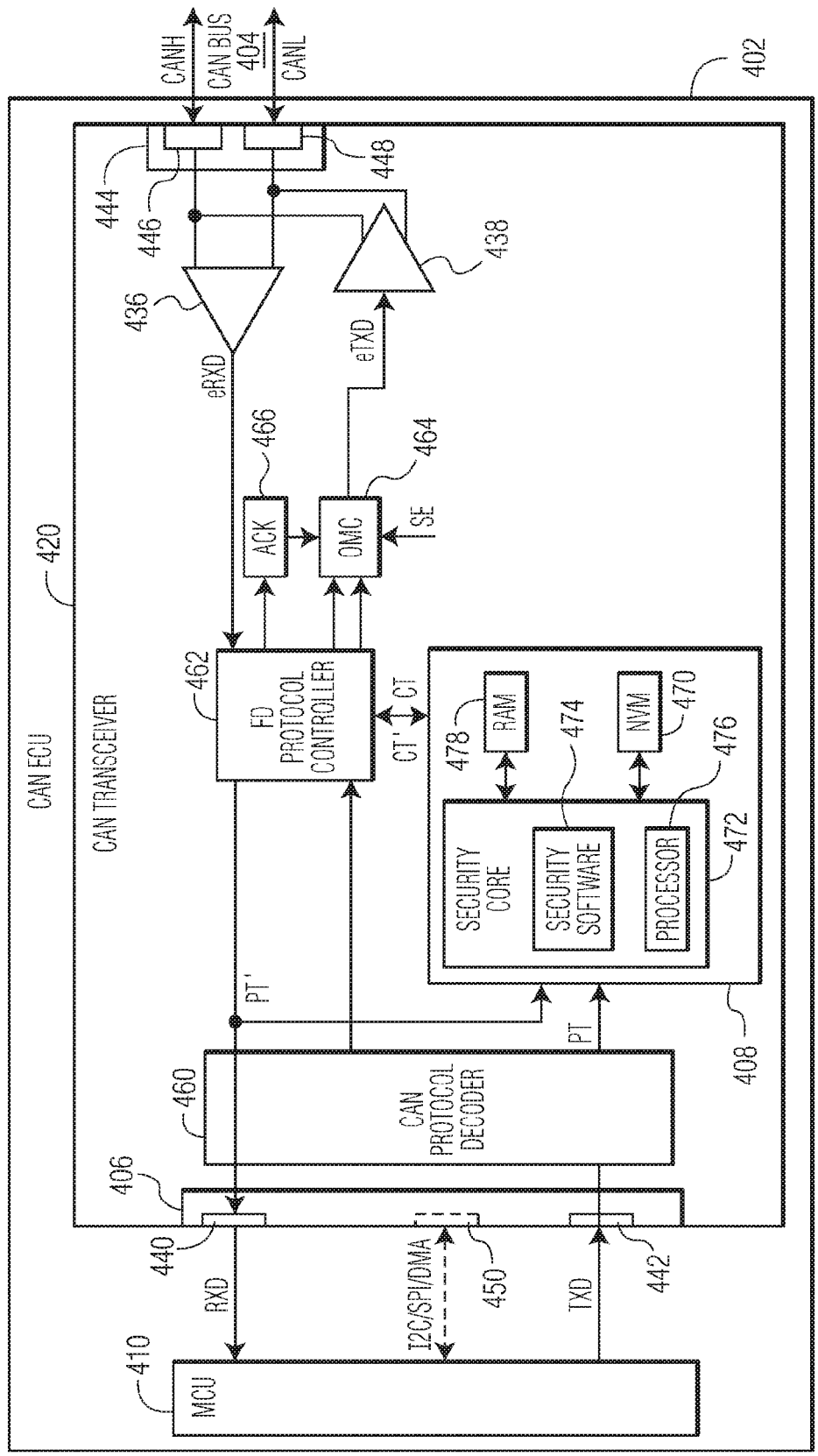
FIGS. 5-7 illustrate some operational cases of the CAN ECU of FIG. 4.
Figure 6:
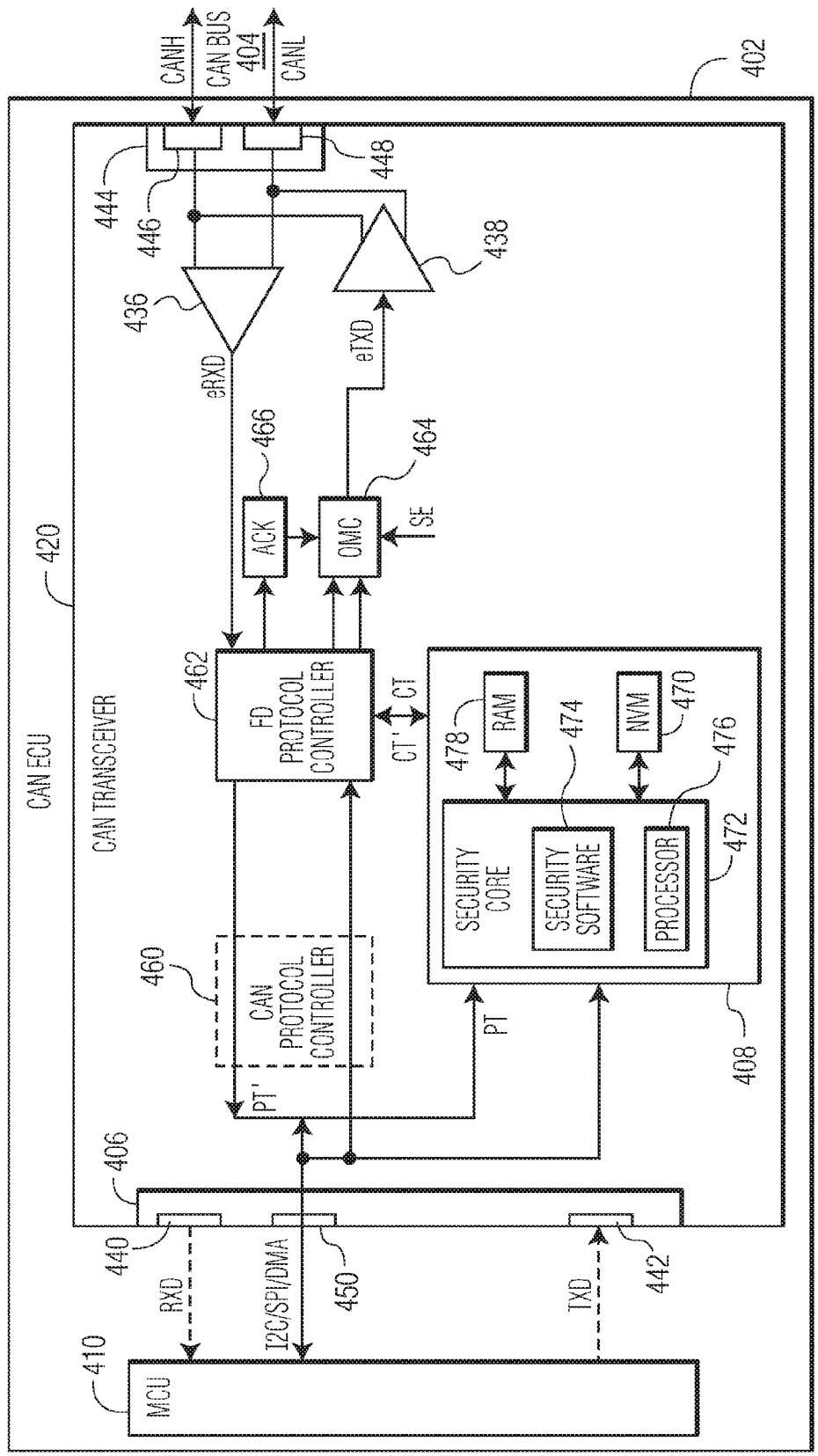
Figure 7:
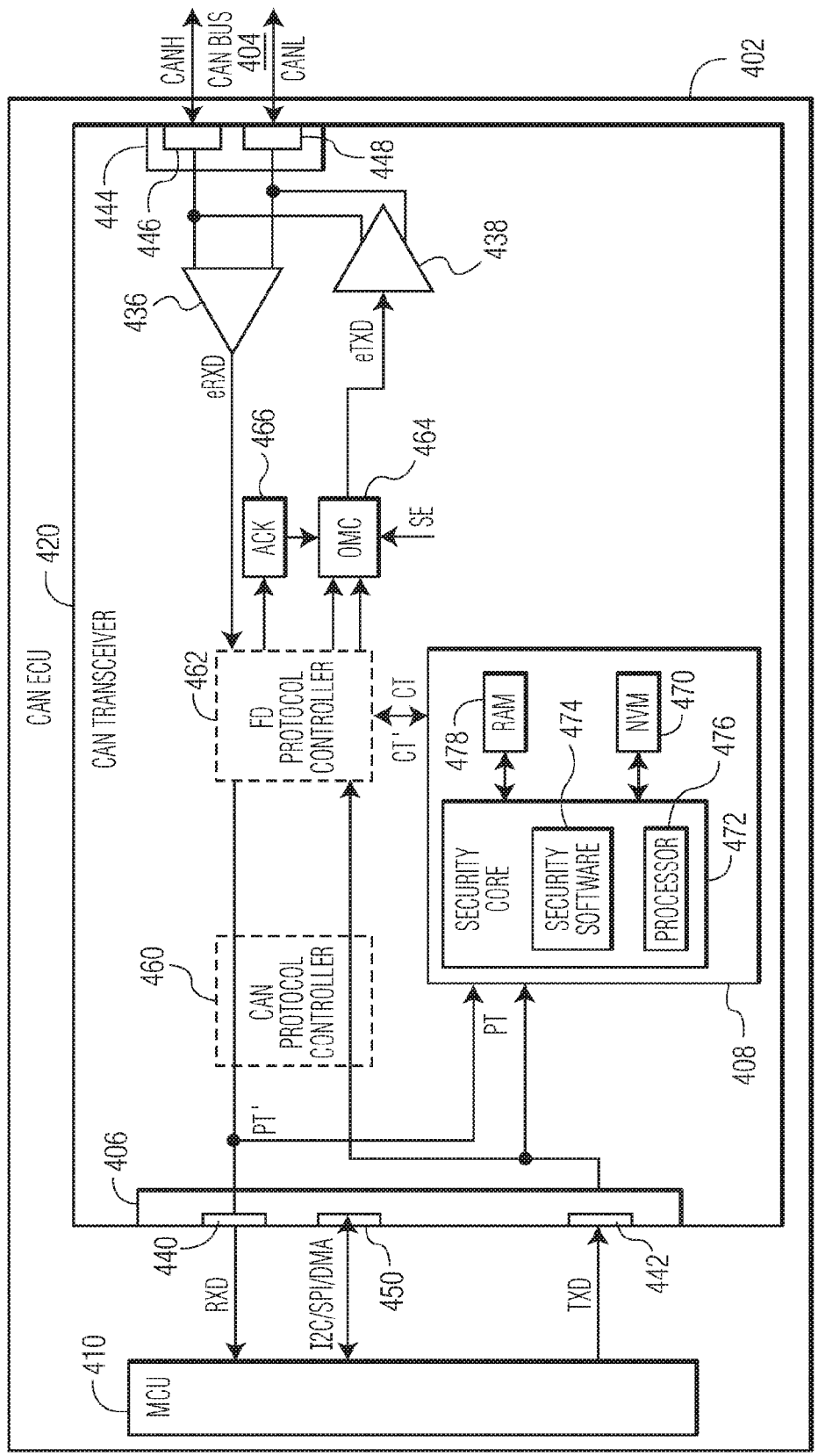

FIGS. 5-7 illustrate interface operations that can be performed by the CAN ECU 402 depicted in FIG. 4. Specifically, FIG. 5 illustrates an operational case of the CAN ECU 402 of FIG. 4 for data communications with the microcontroller 410 through the RXD interface 440 and the TXD interface 442. In the operations illustrated in FIG. 5, the RXD interface and the TXD interface of the microcontroller communications interface 406 are used for communications between the microcontroller 410 and the CAN transceiver 420 in a transmission mode of the transceiver and in a reception mode of the transceiver.

In the transmission mode, the CAN protocol decoder 460 extracts the data payload from a CAN frame that is received from the microcontroller 410 and the CAN transceiver 420 mimics the successful reception of the CAN frame from the microcontroller in a first step. Then in the second step the channel arbitration priority for the transmission onto the CAN bus 404 is taken by the CAN transceiver 420. Subsequently, in a third step, security software hosted and executed on the security module 408 calculates the CMAC digest for ensuring message integrity of the data payload (plain text "PT") and creates a counter value, which is used for immunity against replay attacks. At a subsequent step, the FD protocol controller 462 of the CAN transceiver appends the data payload, PT, the CMAC digest, and the counter value, calculates a cyclic redundancy check (CRC) code and other frame identifiers, and creates a new CAN FD frame. Subsequently, in a next step, the CAN FD frame is transmitted via the CAN bus 404 if the channel is free.

For the message acknowledgement (ACK) of a received CAN FD frame, the CAN transceiver 420 is shifted from the transmission mode to the reception mode. If the message acknowledgement (ACK) is not received before the expiration of a time out, the received CAN FD frame is retransmitted to the transceiver. Specifically, in the reception mode, an incoming CAN FD frame is written directly into a buffer (not shown) defined on the RAM 478 of the security module 408. The received frame is parsed according to the CAN/CAN FD protocol requirements, and the CRC code is checked to detect corruption by noise. Corrupted frames or frames not addressed to the concerned node are discarded as configured by the microcontroller 410 and the receiver buffer remains empty. Subsequently, the FD protocol controller 462 extracts the CMAC digest (CT') and the data payload (PT') from the received CAN FD frame. At a subsequent step, the security software 474 in the security core 472 calculates the CMAC digest (CT) on the received data payload, PT', and compares the calculated CMAC digest, CT, with the extracted CMAC digest, CT', to ensure the message integrity. The reception mode utilizes a buffer defined on the RAM 478 of the security module 408. When the CAN transceiver mimics the successful acceptance of a CAN frame to the microcontroller, the CAN transceiver stores the CAN frame (with e.g., the CMAC signature and counter value) temporarily in the buffer before the data transmission takes place on the CAN bus 404.

FIG. 6 illustrates an operational case of the CAN ECU 402 of FIG. 4 for data communications with the microcontroller 410 through the I2C/SPI/DMA interface 450 of the microcontroller communications interface 406. In the operations illustrated in FIG. 6, the I2C/SPI/DMA interface is used for communications between the microcontroller and the CAN transceiver 420 in a transmission mode of the transceiver and in a reception mode of the transceiver.

In the transmission mode, the application software running on the microcontroller 410 creates raw data (data payload), which is stored in a buffer defined on a RAM of the microcontroller. Subsequently, the data payload (plain text, 8 Bytes maximum limit of CAN frame) is transferred to the CAN transceiver 420 via the I2C/SPI/DMA interface 450. In a subsequent step, the security software 474 hosted and executed on the security core 472 calculates the CMAC digest to ensure message integrity of the data payload (plain text "PT") and creates a counter value, which is used for immunity against replay attack. Subsequently, the FD protocol controller 462 appends the CMAC digest and the counter value to the data payload to create a CAN FD frame and transmits the CAN FD frame.

For the message acknowledgement (ACK) of a received CAN FD frame, the CAN transceiver 420 is shifted from the transmission mode to the reception mode. If the ACK is not received before the expiration of a time out, the received CAN FD frame is retransmitted to the CAN transceiver through the CAN bus interface 444. Specifically, in the reception mode, the incoming CAN FD frame from the CAN bus interface is written directly into the buffer defined on the RAM 478 of the security module 408. The received CAN FD frame is parsed in the FD protocol controller 462 according to the CAN FD protocol requirements. The CRC is checked to detect corruption by noise. Corrupted frames or frames not addressed to the concerned node are discarded. Subsequently, the CAN FD protocol controller of the transceiver extracts the CMAC digest (CT') and the data payload, PT', from the frame. The CAN protocol decoder of the CAN transceiver is bypassed and is not used in the operation case illustrated in FIG. 6. The security SW 474 on the security core 472 calculates the CMAC digest on the received data payload, PT', and compares the calculated CMAC digest with the extracted CMAC digest, CT', to ensure the message integrity. For messages that pass the security check, the plain text data payload is transferred back to the microcontroller 410 via the I2C/SPI/DMA interface 450. The reception mode relies on the CAN FD protocol controller, which is used for generating CAN/CAN FD frames.

FIG. 7 illustrates an operational case of the CAN ECU 402 of FIG. 4 for data communications with the microcontroller 410 through the RXD interface 440, the TXD interface 442, and the I2C/SPI/DMA interface 450 of the microcontroller communications interface 406. In the operations illustrated in FIG. 7, the RXD interface, the TXD interface, and the I2C/SPI/DMA are used for communications between the microcontroller and the CAN transceiver 420 in a transmission mode of the transceiver and in a reception mode of the transceiver. The interface option depicted in FIG. 7 assumes that the microcontroller has a built-in CAN FD protocol controller and that the microcontroller may have a built-in CAN FD protocol controller and intend to use the built-in CAN FD controller.

In the transmission mode, the microcontroller 410 creates raw data (data payload), which is stored on buffers defined on the RAM of the microcontroller. Subsequently, the data payload (plain text) is transferred to the CAN transceiver 420 via the I2C/SPI/DMA interface 450. At a subsequent step, the security software hosted and executed on the security core of the security module 408 calculates the CMAC digest to ensure message integrity of the data payload (plain text "PT") and creates a counter value, which is used for immunity against replay attack. Subsequently, the counter value and CMAC digest is transferred back to the microcontroller via the I2C/SPI/DMA interface. Subsequently, the microcontroller appends the CMAC digest and the counter value to the data payload to create a CAN FD frame, which is then transmitted to the transceiver via the TXD interface 442.

For the message acknowledgement (ACK) of a received CAN FD frame, the CAN transceiver 420 is shifted from the transmission mode to the reception mode. If the ACK is not received before the expiration of a time out, the received CAN FD frame is retransmitted to the transceiver through the CAN bus interface 444. The reception mode assumes that the microcontroller 410 includes a built-in CAN FD protocol controller and a channel arbitration controller, which is possible with a classic CAN controller only when the truncation of CMAC and counter value is done resulting in a less secure implementation. Specifically, in the reception mode, the incoming CAN FD frame is written directly into a buffer defined on a RAM of the microcontroller. The received CAN FD frame is parsed in the microcontroller according to the CAN FD protocol requirements. The CRC is checked in the microcontroller to detect corruption by noise. Corrupted frames or frames not addressed to the concerned node are discarded as configured by the microcontroller and the receiver buffer remains empty. A CAN FD decoder of the microcontroller extracts the CMAC digest (CT') and the data payload, PT', from the CAN FD frame. Subsequently, the microcontroller accesses the security core 472 of the security module 408 via the I2C/SPI/DMA interface 450. The security software 474 of the security core calculates the CMAC digest on the received data payload, PT', and compares the calculated CMAC digest with the extracted CMAC digest, CT', to ensure message integrity.

Figure 8:
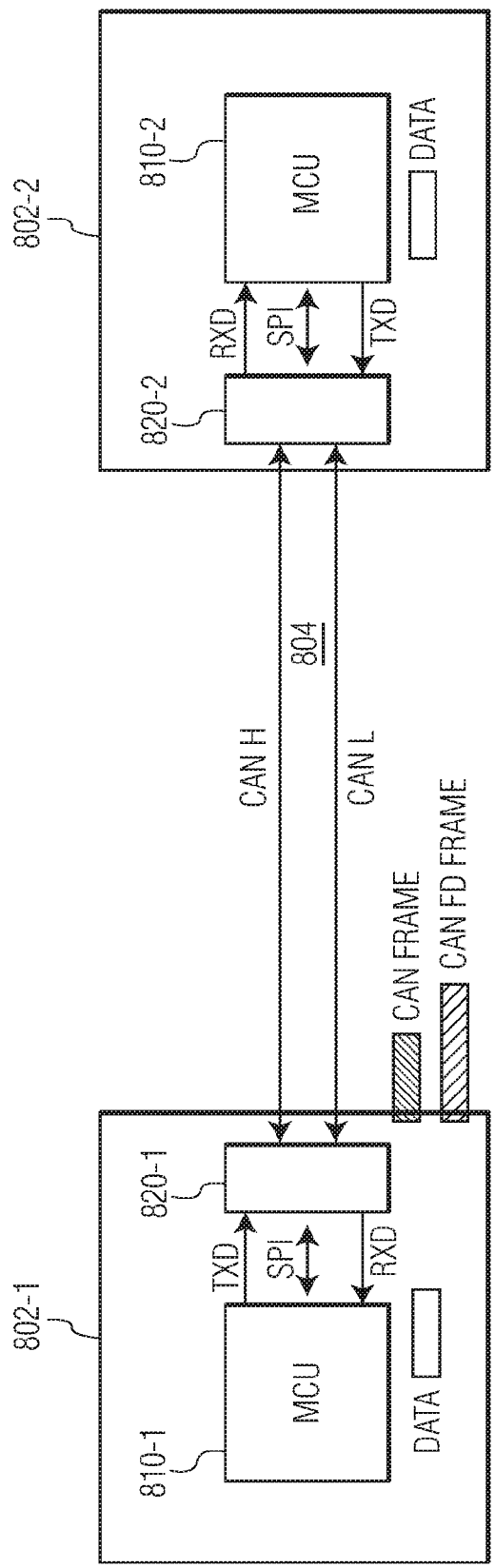
FIG. 8 illustrates a communications operation between two CAN ECUs.

The CAN ECU 402 can process classic CAN frames as well as CAN FD frames with larger payloads. Consequently, the CAN ECU can communicate with classical CAN ECUs as well as CAN ECUs with FD protocol controllers. In some embodiments, the CAN ECU operates in a CAN FD operational mode and in a CAN FD & classic CAN operational mode. FIG. 8 illustrates a communications operation between two CAN ECUs 802-1, 802-2. The CAN ECU 802-1 includes a microcontroller 810-1 and a CAN transceiver 820-1 and the CAN ECU 802-2 includes a microcontroller 810-2 and a CAN transceiver 820-2. The CAN ECUs 802-1, 802-2 depicted in FIG. 8 may be the same as or similar to the CAN ECU 402 depicted in FIG. 4. The microcontrollers 810-1, 810-2 depicted in FIG. 8 may be the same as or similar to the microcontroller 410 depicted in FIG. 4. The CAN transceivers 820-1, 820-2 depicted in FIG. 8 may be the same as or similar to the CAN transceiver 420 depicted in FIG. 4. For secure communications between the CAN ECUs 802-1, 802-2, the CAN transceiver 802-1 creates a CAN FD frame with a non-truncated CMAC signature (128 bit, 192 bit and 256 bit) and counter bits and the data of an original CAN frame. For regular communications between the CAN ECUs 802-1, 802-2, the CAN transceiver 802-1 uses a CAN frame.

In a transmission mode, the CAN transceiver 802-1 or 802-2 transmits an original data plain text CAN frame and transmits a signature containing (CMAC signature and counter value) CAN FD frame with the same identifier (ID) as the original plain text CAN frame. In some embodiments, the CAN transceiver packs the original message along with the signature in one CAN frame so that a security requirement to send the signature and the message in the same message is satisfied.

In a reception mode, the CAN transceiver 802-1 or 802-2 receives a CAN FD frame and checks for transmission related errors (e.g., CRC check). If there are no transmission related errors, the CAN transceiver transmits an ACK signal to the sender. The ACK signal then activates the CAN frame transmission at the sender node. In the mean time, the receiving CAN transceiver verifies the CMAC signature and counter value. If the CMAC signature and counter value are verified, a CAN frame received later with the same identifier (ID) as the CAN FD signature frame is transferred to the microcontroller 410. In the case of a signature (CMAC and counter value) mismatch, the CAN frame is ignored. For non-critical CAN nodes, an FD shield can be utilized to identify and to ignore CMAC enabled CAN FD frames. When a non-critical CAN node receives a CAN frame containing the plain text data, the CAN node checks for transmission related errors and transfers the plain text data to the microcontroller for processing in the absence of transmission related errors.

Figure 9:
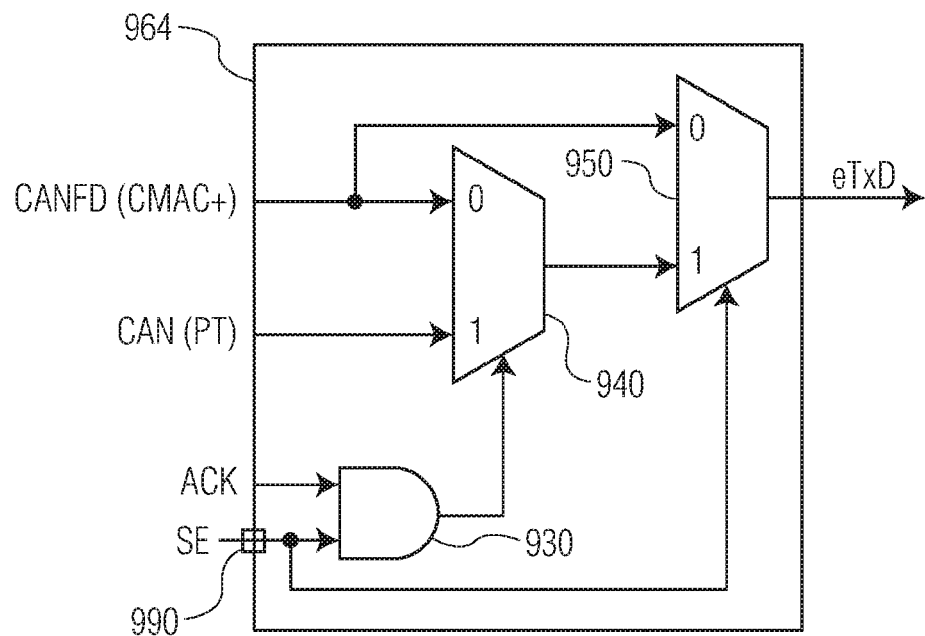
FIG. 9 depicts an embodiment of the operational mode controller (OMC) of the CAN transceiver depicted in FIG. 4.

FIG. 9 depicts an embodiment of the operational mode controller (OMC) 464 of the CAN transceiver 402 depicted in FIG. 4. The OMC 964 depicted in FIG. 9 is one possible embodiment of the OMC 464 depicted in FIG. 4. However, the OMC depicted in FIG. 4 is not limited to the embodiment shown in FIG. 9. The OMC is configured to set the operating mode for the CAN transceiver 420 based on a control signal, "SE," received from a control terminal/pin 990 of the OMC. The OMC receives an ACK signal from the ACK module 466 (shown in FIG. 4), a CAN FD frame and a CAN frame from the FD protocol controller 462 (shown in FIG. 4), and outputs an encrypted transmit data (eTXD) to the transmitter 438 (shown in FIG. 4).

In the embodiment depicted in FIG. 9, the OMC 964 includes an AND gate 930, a first multiplexer 940, and a second multiplexer 950. Selection signals for the first and second multiplexers include an output signal of the AND gate and the control signal, SE, from the control terminal 990 of the operational mode controller. Input signals to the AND gate include the control signal and an acknowledgement signal generated by the acknowledgement (ACK) module 466. Input signals to the first multiplexer include a CAN FD frame and a CAN frame and input signals to the second multiplexer include the CAN FD frame and the output signal from the first multiplexer.

Figure 10:
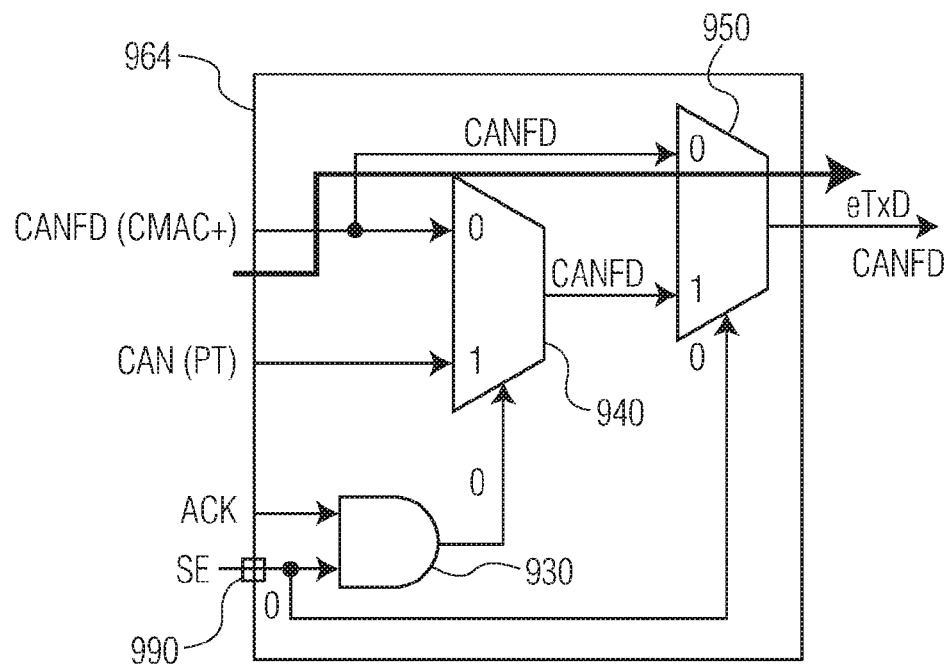
FIGS. 10-12 illustrate some operational cases of the OMC depicted in FIG. 9.

FIG. 10 illustrates an operational case of the OMC 964 depicted in FIG. 9 where the control signal, SE, is set to "0." When the control signal, SE, is set to 0, the OMC 964 enables the CAN FD mode of communication for the CAN transceiver in which the output is an original message, a signature (CMAC), and a counter value (time stamp) packaged as a CAN FD frame. When the control signal, SE, is set to 0, the output signal of the AND gate 930 is logical zero, and selection signals to the first and second multiplexers 940, 950 are logical zero. Consequently, the first and second multiplexers select the signal, CAN FD, applied to the "0" input terminals of the first and second multiplexers as their output signals. As shown in FIG. 10, the OMC outputs the CAN FD frame when the control signal, SE, is set to 0.

Figure 11:
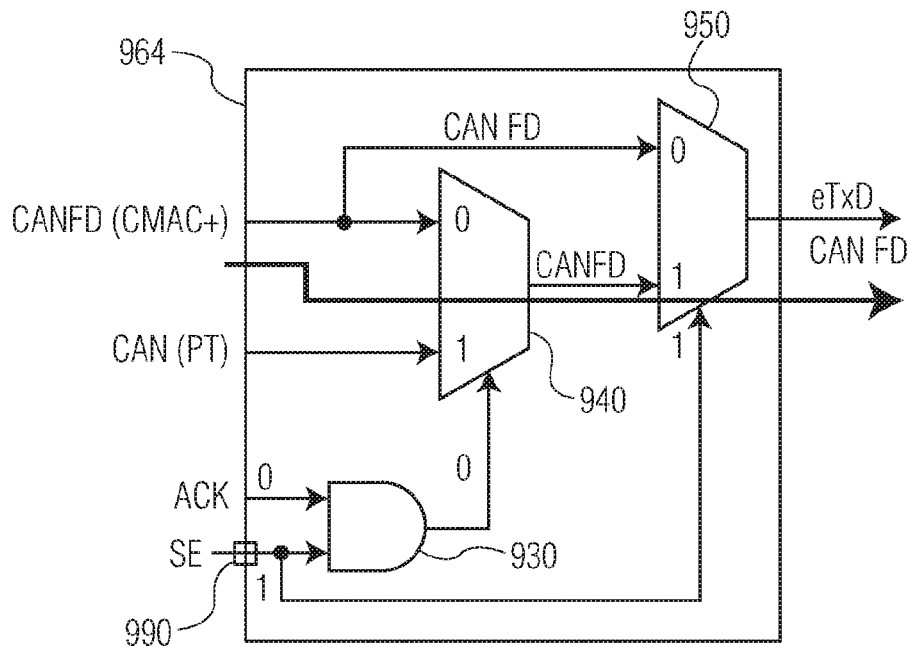
Figure 12:
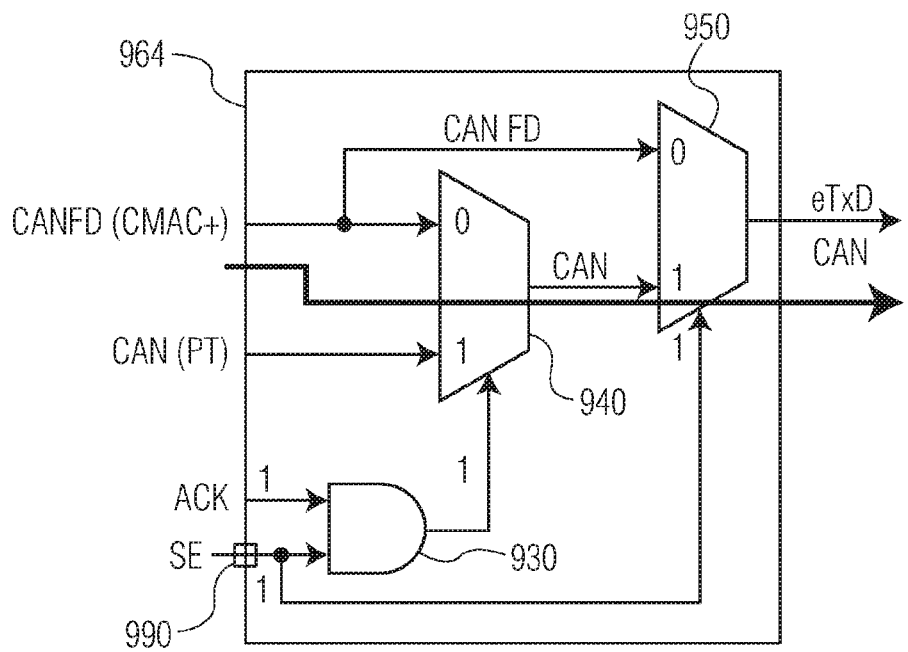

FIGS. 11 and 12 illustrate two operational cases of the OMC 964 depicted in FIG. 9 where the control signal, SE, is set to "1." When the control signal, SE, is set to "1," the OMC is configured to enable the CAN FD & classic CAN combination mode of communications for the CAN transceiver. Under the CAN FD & classic CAN combination mode, for input data, the CAN transceiver 420 creates two frames, which are a security enabled CAN FD frame and a plain text data CAN frame. Specifically, firstly the CAN FD is transmitted (FIG. 11), subsequently, when the ACK is received (sets to "1") the OMC outputs the plain text CAN frame (FIG. 12). When the control signal, SE, is initially set to 1, the ACK has not been received, and the output signal of the AND gate 930 is logical zero. Consequently, the selection signal to the first multiplexer 940 is logical zero and the selection signal to the second multiplexer 950 is logical one. Consequently, the first multiplexer selects the signal, CAN FD, applied to the "0" input terminal of the first multiplexer as its output signal and the second multiplexer selects the signal, CAN FD, applied to the "1" input terminal of the second multiplexer as its output signal. As shown in FIG. 11, the OMC outputs the CAN FD frame when the control signal, SE, is initially set to 0. After the ACK is received, the output of the AND gate changes to 1, and the first multiplexer selects the signal, CAN, applied to the "1" input terminal of the first multiplexer as its output signal. The second multiplexer selects the signal, CAN, applied to the "1" input terminal of the second multiplexer as its output signal. As shown in FIG. 12, the OMC outputs the CAN frame when the control signal, SE, is set to 0 and ACK is received.

Figure 13:
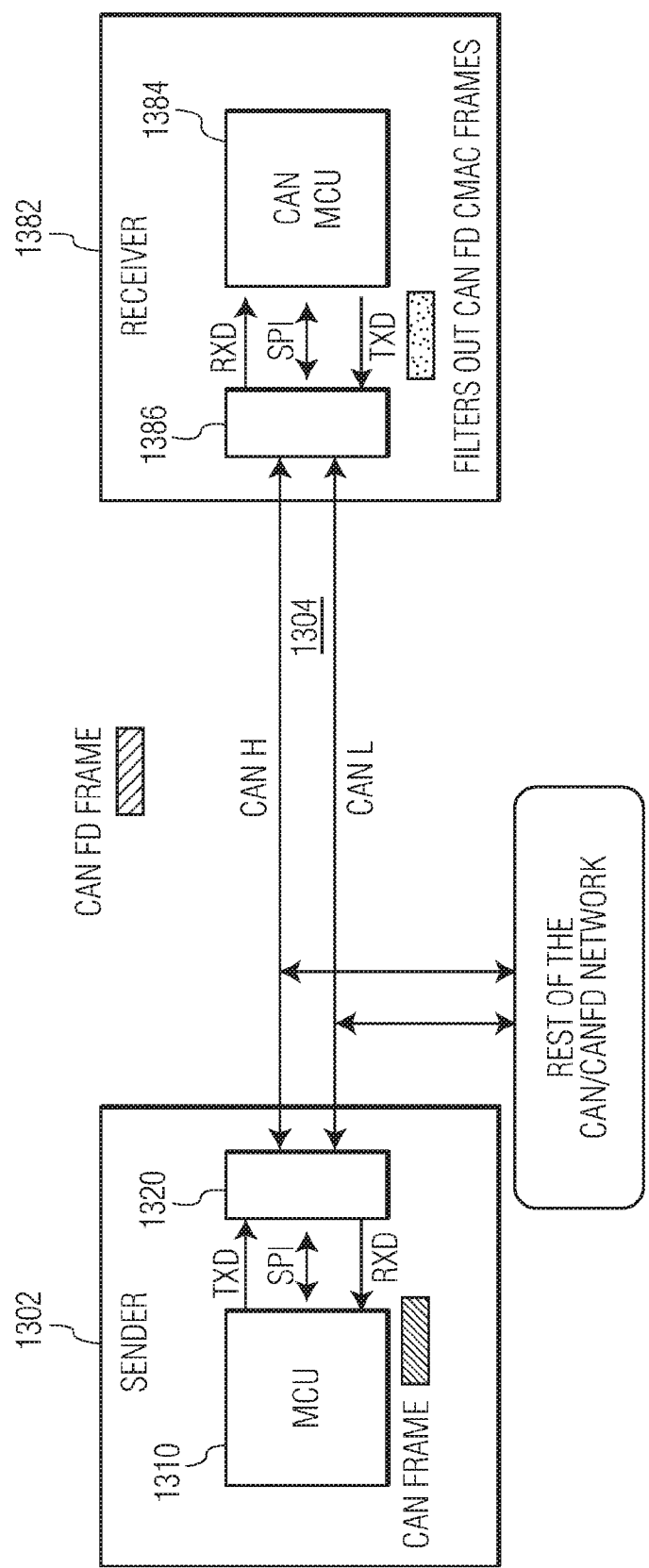
FIG. 13 illustrates a communications operation between two CAN ECUs.

Compared to the operational case of the OMC 964 where the control signal, SE, is set to 0, the operational cases of the OMC 964 where the control signal, SE, is set to 1, does not require all classical ECUs to be retrofitted with CAN FD capabilities or replaced with CAN FD compatible ECUs. Consequently, the operational cases of the OMC 964 where the control signal, SE, is set to 1 enables non critical nodes to participate in the network communication with the help of an FD shield device, which filters out CAN FD frames, as shown in a communications operation depicted in FIG. 13. FIG. 13 illustrates a communications operation between two CAN ECUs 1302, 1382. The CAN ECU 1302 includes a microcontroller 1310 and a CAN transceiver 1320 and a classic CAN ECU 1382 includes a microcontroller 1384 and a classic CAN transceiver 1386. The CAN ECU 1302 depicted in FIG. 13 may be the same as or similar to the CAN ECU 402 depicted in FIG. 4. The microcontroller 1310 depicted in FIG. 13 may be the same as or similar to the microcontroller 410 depicted in FIG. 4. The CAN transceiver 1310 depicted in FIG. 13 may be the same as or similar to the CAN transceiver 420 depicted in FIG. 4. The classic CAN ECU 1382 can interpret non-secured communications from the CAN ECU 1302 and can filter out CAN FD frames, for example, using an FD shield device.

Figure 14:
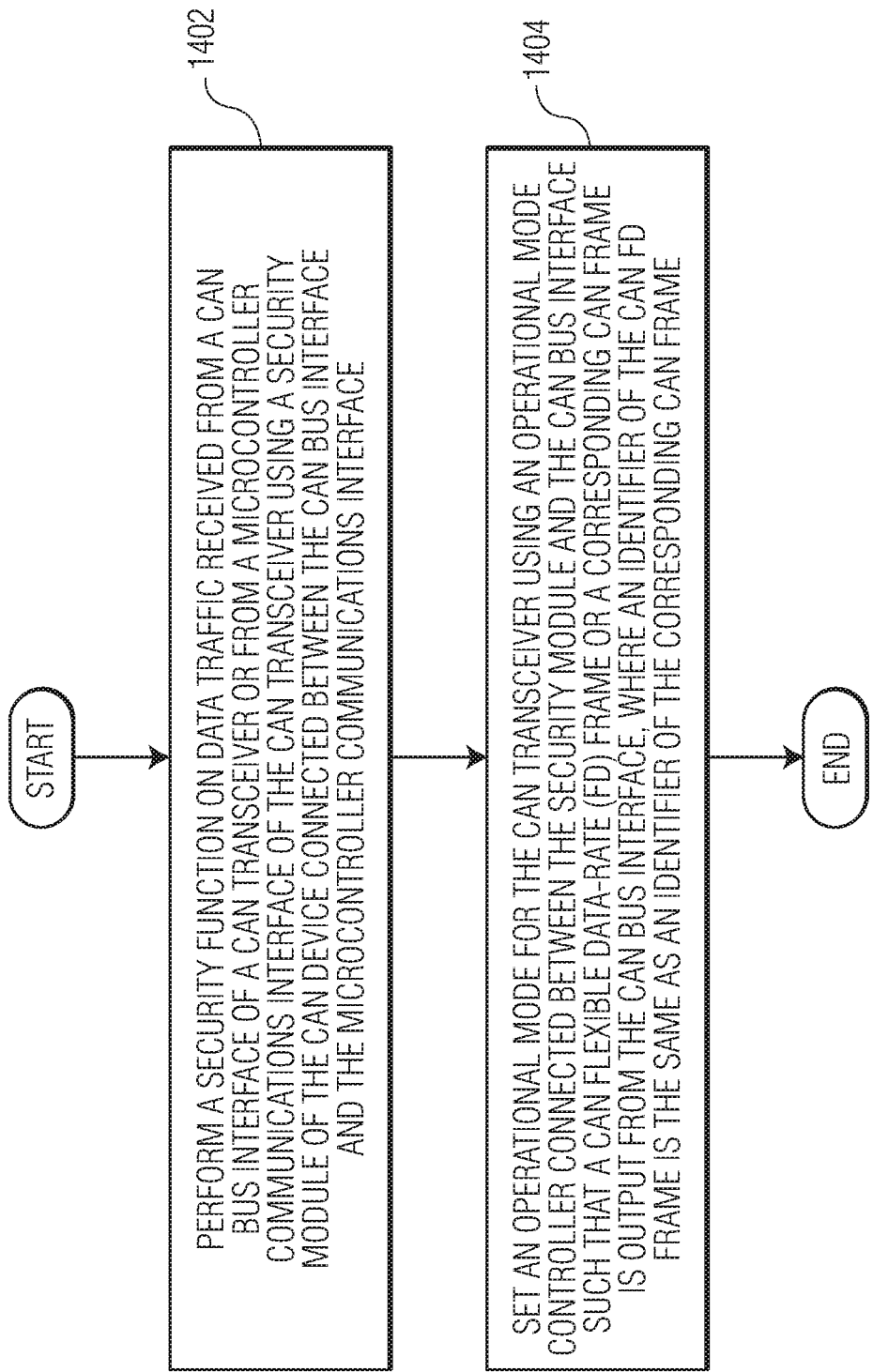
FIG. 14 is a process flow diagram of a method for operating a CAN device in accordance with an embodiment of the invention.

FIG. 14 is a process flow diagram of a method for operating a CAN device in accordance with an embodiment of the invention. At block 1402, a security function is performed on data traffic received from a CAN bus interface of a CAN transceiver or from a microcontroller communications interface of the CAN transceiver using a security module of the CAN device connected between the CAN bus interface and the microcontroller communications interface. At block 1404, an operational mode for the CAN transceiver is set using an operational mode controller connected between the security module and the CAN bus interface such that a CAN FD frame or a corresponding CAN frame is output from the CAN bus interface. An identifier (ID) of the CAN FD frame is the same as an identifier (ID) of the corresponding CAN frame. The CAN transceiver may be the same as or similar to the CAN transceiver 120 depicted in FIG. 1, the CAN transceiver 420 depicted in FIGS. 4-7, the CAN transceiver 820 depicted in FIG. 8, and/or the CAN transceiver 1320 depicted in FIG. 13. The operational mode controller may be the same as or similar to the operational mode controller 464 depicted in FIGS. 4-7 and/or the operational mode controller 964 depicted in FIGS. 9-12.

Figure 15:
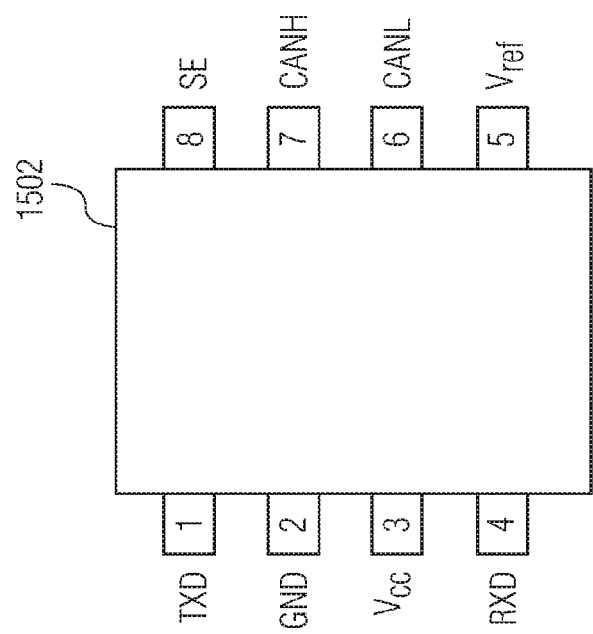
FIG. 15 depicts the CAN transceiver depicted in FIG. 5 embodied as a packaged IC device.

FIG. 15 depicts the transceiver 420 depicted in FIG. 5 embodied as a packaged IC device 1502. The packaged IC device 1502 includes the CAN protocol decoder 460, the flexible data rate (FD) protocol controller 462, the operational mode controller (OMC) 464, the acknowledgement module 466, the receiver 436, the transmitter 438, the microcontroller communications interface 406, and the CAN bus interface 444 (shown in FIG. 5). As shown in FIG. 15, the packaged IC device of the transceiver 420 includes 8 pins/terminals, TXD (pin 1, transmit data input), GND (pin 2, ground), VCC (pin 3, supply voltage), RXD (pin 4, receive data output), Vref (pin 5, reference voltage output), CANL (pin 6, LOW-level CAN voltage input/output), CANH (pin 7, HIGH-level CAN voltage input/output), SE (pin 8, operational mode selection). In some embodiments, the packaged IC device of the transceiver includes one or more SPI/I2C/DMA pins, instead of or in addition to the TXD and RXD pins. The packaged IC device depicted in FIG. 15 is one possible packaged IC device of the transceiver 420 depicted in FIG. 5. However, the packaged IC device of the transceiver 420 depicted in FIG. 4 is not limited to the embodiment shown in FIG. 15. For example, in embodiments where the transceiver does not include RXD/TXD interfaces, the packaged IC device does not include TXD/RXD pins.

Techniques described herein can be applied to any type of IVNs, including a CAN, a LIN, a MOST network, a FlexRay™ compatible network, and other types of IVNs. Although in some embodiments CAN transceiver is described, it should be noted that the invention is not restricted to CAN transceivers.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods described herein may be implemented using software instructions stored on a computer useable storage medium for execution by a computer. As an example, an embodiment of a computer program product includes a computer useable storage medium to store a computer readable program.

The computer-useable or computer-readable storage medium can be an electronic, magnetic, optical, electromagnetic, infrared, or semiconductor system (or apparatus or device). Examples of non-transitory computer-useable and computer-readable storage media include a semiconductor or solid state memory, magnetic tape, a removable computer diskette, a random access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

Alternatively, embodiments of the invention may be implemented entirely in hardware or in an implementation containing both hardware and software elements. In embodiments which use software, the software may include but is not limited to firmware, resident software, microcode, etc.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A method for operating a Controller Area Network (CAN) device, the method comprising:
performing a security function on data traffic received from a CAN bus interface of a CAN transceiver or from a microcontroller communications interface of the CAN transceiver using a security module of the CAN device connected between the CAN bus interface and the microcontroller communications interface; and
setting an operational mode for the CAN transceiver using an operational mode controller connected between the security module and the CAN bus interface such that a CAN Flexible Data-rate (FD) frame or a corresponding CAN frame is output from the CAN bus interface, wherein an identifier of the CAN FD frame is the same as an identifier of the corresponding CAN frame.

2. A Controller Area Network (CAN) device comprising:
a CAN transceiver having a CAN bus interface and a microcontroller communication interface, wherein the CAN transceiver includes a security module connected between the CAN bus interface and the microcontroller communications interface; and
an operational mode controller connected between the security module and the CAN bus interface, wherein the operational mode controller is configured to set an operational mode for the CAN transceiver such that a CAN Flexible Data-rate (FD) frame or a corresponding CAN frame is output from the CAN bus interface, and wherein an identifier of the CAN FD frame is the same as an identifier of the corresponding CAN frame, wherein the security module is configured to perform a security function on data traffic received from the CAN bus interface or from the microcontroller communications interface.

3. The CAN device of claim 2, wherein the security module is a programmable cryptographic module configured to execute security software programs to process a data payload that is carried by a plurality of data signals received through the microcontroller communications interface or through the CAN bus interface.

4. The CAN device of claim 3, wherein the programmable cryptographic module is configured to generate a Cipher-based Message Authentication Code (CMAC) digest and a counter value based on the data payload.

5. The CAN device of claim 4, further comprising a CAN FD protocol controller connected to the microcontroller communications interface and to the operational mode controller, wherein the CAN FD protocol controller is configured to combine the payload with the CMAC digest and the counter value to generate the CAN FD frame.

6. The CAN device of claim 5, wherein the CAN FD protocol controller is further configured to generate the CAN frame.

7. The CAN device of claim 6, further comprising a CAN protocol decoder configured to extract the data payload from the data signals received through the microcontroller communications interface, and wherein the security core is further configured to process the data payload to generate a Cipher-based Message Authentication Code (CMAC) digest and a counter value.

8. The CAN device of claim 7, further comprising a CAN FD protocol controller connected to the microcontroller communications interface and to the operational mode controller, wherein the CAN FD protocol controller is configured to combine the payload with the CMAC digest and the counter value to generate the CAN FD frame.

9. The CAN device of claim 8, wherein the CAN FD protocol controller is further configured to generate the CAN frame that has the same packet identification number as the CAN FD frame.

10. The CAN device of claim 3, wherein the programmable cryptographic module comprises:
   a security core configured to execute security software routines; and
   a memory device configured to store security configuration information for the security software routines.

11. The CAN device of claim 2, wherein the operational mode controller comprises an AND gate and first and second multiplexers, and wherein selection signals to the first and second multiplexers comprise an output signal of the AND gate and a control signal from a control terminal of the operational mode controller.

12. The CAN device of claim 11, wherein input signals to the AND gate comprise the control signal and an acknowledgement signal, wherein input signals to the first multiplexer comprise the CAN FD frame and the CAN frame, and wherein input signals to the second multiplexer comprise the CAN FD frame and an output signal from the first multiplexer.

13. The CAN device of claim 2, wherein the CAN microcontroller communications interface comprises a receive data (RXD) interface, a transmit data (TXD) interface and a Serial Peripheral Interface (SPI)/Inter-Integrated Circuit (I2C)/Direct Memory Access (DMA) interface.

14. An electronic control unit comprising the CAN transceiver of claim 2 and a microcontroller, wherein a microcontroller communications interface of the CAN transceiver is used for communications with the microcontroller.

15. A Controller Area Network (CAN) transceiver comprising:
   a CAN bus interface having a CAN high (CANH) bus interface and a CAN low (CANL) bus interface;
   a CAN microcontroller communications interface having a receive data (RXD) interface, a transmit data (TXD) interface and a Serial Peripheral Interface (SPI)/Inter-Integrated Circuit (I2C)/Direct Memory Access (DMA) interface;
   a programmable cryptographic module connected between the CAN bus interface and the CAN microcontroller communications interface, wherein the programmable cryptographic module is configured to perform a security function on data traffic received from the CAN bus interface or from the CAN microcontroller communications interface; and
   an operational mode controller connected between the programmable cryptographic module and the CAN bus interface, wherein the operational mode controller is configured to set an operational mode for the CAN transceiver such that a CAN Flexible Data-rate (FD) frame or a corresponding CAN frame is output from the CAN bus interface, and wherein an identifier of the CAN FD frame is the same as an identifier of the corresponding CAN frame.

16. The CAN transceiver of claim 15, wherein the programmable cryptographic module comprises:
   a security core comprising at least one of a hardware-based Advanced Encryption Standard (AES) engine, a hardware-based Secure Hash Algorithm (SHA) engine, a hardware-based counter and a hardware-based true random number generator; and
   a memory device configured to store security configuration information for the security core.

17. The CAN transceiver of claim 16, further comprising a CAN protocol decoder configured to extract the data payload from the data signals received through the CAN microcontroller communications interface, and wherein the security core is further configured to process the data payload to generate a Cipher-based Message Authentication Code (CMAC) digest and a counter value.

18. The CAN transceiver of claim 17, further comprising a CAN FD protocol controller connected to the CAN microcontroller communications interface and to the operational mode controller, wherein the CAN FD protocol controller is configured to:
   combine the payload with the CMAC digest and the counter value to generate the CAN FD frame; and
   generate the CAN frame that has the same packet identification number as the CAN FD frame.

19. The CAN transceiver of claim 15, wherein the operational mode controller comprises an AND gate and first and second multiplexers, wherein selection signals to the first and second multiplexers comprise an output signal of the AND gate and a control signal from a control terminal of the operational mode controller, wherein input signals to the AND gate comprise the control signal and an acknowledgement signal, wherein input signals to the first multiplexer comprise the CAN FD frame and the CAN frame, and wherein input signals to the second multiplexer comprise the CAN FD frame and an output signal from the first multiplexer.

* * * * *